(12) United States Patent
Hughes

(10) Patent No.: US 11,084,043 B2
(45) Date of Patent: Aug. 10, 2021

(54) IMPACT CUTTER BLADE AND HOLDER SYSTEM AND METHOD

(71) Applicant: COMCORP, INC., Montesano, WA (US)

(72) Inventor: John H. Hughes, Montesano, WA (US)

(73) Assignee: COMCORP, INC., Montesano, WA (US)

( * ) Notice: Subject to any disclaimer, the term of this patent is extended or adjusted under 35 U.S.C. 154(b) by 40 days.

(21) Appl. No.: 16/508,966

(22) Filed: Jul. 11, 2019

(65) Prior Publication Data

US 2019/0329263 A1 Oct. 31, 2019

Related U.S. Application Data

(63) Continuation of application No. 15/261,691, filed on Sep. 9, 2016, now Pat. No. 10,357,776.

(51) Int. Cl.
| | |
|---|---|
| *B02C 18/18* | (2006.01) |
| *B27L 11/00* | (2006.01) |
| *B02C 18/06* | (2006.01) |
| *B23D 61/02* | (2006.01) |
| *B02C 18/00* | (2006.01) |

(52) U.S. Cl.
CPC .............. *B02C 18/18* (2013.01); *B02C 18/06* (2013.01); *B02C 18/182* (2013.01); *B02C 18/184* (2013.01); *B23D 61/023* (2013.01); *B23D 61/025* (2013.01); *B27L 11/005* (2013.01); *B02C 18/0084* (2013.01); *B02C 2201/066* (2013.01); *B02C 2210/02* (2013.01)

(58) Field of Classification Search
CPC ............ B02C 2201/066; B02C 18/184; B02C 18/0084; B02C 18/18; B02C 18/182; B27L 11/005; B23D 61/023; B23D 61/025

USPC ........ 241/73, 30, 92, 195, 190, 194, 101.78, 241/295, 296

See application file for complete search history.

(56) References Cited

U.S. PATENT DOCUMENTS

| | | |
|---|---|---|
| 617,523 A | 1/1899 | Day |
| 1,324,389 A | 12/1919 | Ekola |
| 1,736,563 A | 11/1929 | Wilmot |
| 1,903,526 A | 4/1933 | Andrews |
| 2,012,602 A | 8/1935 | Forrester |

(Continued)

FOREIGN PATENT DOCUMENTS

| | | |
|---|---|---|
| EP | 0 121 751 A1 | 10/1984 |
| GB | 2 122 480 A | 1/1984 |
| SU | 1151302 A | 4/1985 |

OTHER PUBLICATIONS

"Illustrated Sourcebook of Mechanical Components" Parmley R.O. editor, (c) 2000 McGraw Hill. Single Page "21-12" (Year: 2000).*

(Continued)

*Primary Examiner* — Sean M Michalski
(74) *Attorney, Agent, or Firm* — Seed Intellectual Property Law Group LLP

(57) ABSTRACT

An impact cutter blade and holder system is disclosed. The impact cutter blade and holder system includes: a cutter disk, a plurality of impact holders, and a plurality of impact cutter blades. The cutter disk has a central axis about which the cutter disk is configured to rotate. The plurality of impact holders are secured to the cutter disk. The plurality of impact cutter blades is secured to the plurality of impact holders.

27 Claims, 7 Drawing Sheets

(56) References Cited

U.S. PATENT DOCUMENTS

| | | | |
|---|---|---|---|
| 2,014,691 A | 9/1935 | Morgan | |
| 2,033,123 A | 3/1936 | Cowles | |
| 2,045,691 A | 6/1936 | Armstrong | |
| 2,620,138 A | 12/1952 | Vazieux et al. | |
| 2,796,807 A | 6/1957 | Sanford | |
| 2,865,572 A | 12/1958 | Lannert | |
| 3,027,106 A * | 3/1962 | Brooks | B27B 33/20 241/294 |
| 3,037,540 A | 6/1962 | Bloomquist et al. | |
| 3,143,303 A | 8/1964 | Palyi | |
| 3,314,617 A | 4/1967 | Sargood | |
| 3,319,897 A | 5/1967 | Craig et al. | |
| 3,430,592 A * | 3/1969 | Florczak | D05B 65/00 112/288 |
| 3,528,617 A | 9/1970 | Trevathan | |
| 3,615,059 A | 10/1971 | Moeller | |
| 3,687,378 A * | 8/1972 | Schweigert | B02C 18/0084 241/142 |
| 3,713,595 A | 1/1973 | Craig et al. | |
| 3,741,104 A | 6/1973 | Kannegiesser | |
| 3,777,793 A * | 12/1973 | Miller | B27B 33/20 144/220 |
| 3,823,633 A | 7/1974 | Ross | |
| 3,893,635 A * | 7/1975 | Brewer | B02C 18/0084 241/243 |
| 3,936,005 A | 2/1976 | Schnell | |
| 3,955,765 A | 5/1976 | Gaitten | |
| 3,964,716 A | 6/1976 | McCorkle et al. | |
| 3,979,078 A | 9/1976 | Böddeker et al. | |
| 4,009,837 A * | 3/1977 | Schnyder | B02C 18/144 241/93 |
| 4,033,515 A | 7/1977 | Bartell et al. | |
| 4,047,670 A * | 9/1977 | Svensson | B02C 18/143 241/92 |
| 4,059,236 A * | 11/1977 | Brewer | B02C 18/14 241/243 |
| 4,106,706 A | 8/1978 | Burrows | |
| 4,120,460 A | 10/1978 | Bucher | |
| 4,162,770 A * | 7/1979 | Lewis | B02C 18/184 241/191 |
| 4,164,329 A * | 8/1979 | Higby | B02C 18/145 241/294 |
| 4,243,183 A | 1/1981 | Eirich et al. | |
| 4,267,982 A | 5/1981 | Hooper | |
| 4,269,244 A * | 5/1981 | Kinsella | B23D 61/06 144/218 |
| 4,325,516 A | 4/1982 | Ismar | |
| 4,366,928 A | 1/1983 | Hughes | |
| 4,448,361 A | 5/1984 | Marcy | |
| 4,454,995 A | 6/1984 | Bloomquist | |
| 4,516,732 A | 5/1985 | Kela et al. | |
| 4,583,415 A | 4/1986 | Locker | |
| 4,593,861 A | 6/1986 | Blakley et al. | |
| 4,650,129 A * | 3/1987 | Newell | B02C 13/28 241/185.5 |
| 4,657,192 A | 4/1987 | Browning | |
| 4,664,320 A | 5/1987 | Steffens | |
| 4,667,713 A * | 5/1987 | Wright | B23C 5/2265 144/231 |
| 4,669,516 A * | 6/1987 | Carpenter | B27L 11/005 144/176 |
| 4,699,326 A | 10/1987 | Warren | |
| 4,736,781 A | 4/1988 | Morey et al. | |
| 4,767,069 A | 8/1988 | Kim | |
| 4,773,601 A | 9/1988 | Urich et al. | |
| 4,790,489 A | 12/1988 | Paul | |
| 4,846,411 A | 7/1989 | Herron et al. | |
| 4,848,682 A | 7/1989 | Scheler | |
| 4,934,615 A | 6/1990 | Osborne | |
| 4,946,109 A * | 8/1990 | Lewis | B02C 18/146 241/189.1 |
| 4,997,135 A | 3/1991 | Zehr | |
| 5,005,772 A | 4/1991 | Ostergaard | |
| 5,022,593 A * | 6/1991 | Stelk | B02C 13/28 241/194 |
| 5,058,815 A | 10/1991 | Pozzato et al. | |
| 5,169,077 A * | 12/1992 | Stelk | B02C 13/28 241/194 |
| 5,215,268 A | 6/1993 | Houle et al. | |
| 5,279,467 A * | 1/1994 | Lydy | B02C 13/28 241/101.78 |
| 5,320,292 A | 6/1994 | Smith | |
| 5,348,064 A * | 9/1994 | Nettles | B27L 11/005 144/162.1 |
| 5,348,065 A * | 9/1994 | Meyer | B26D 7/2614 144/230 |
| 5,379,951 A * | 1/1995 | Hughes | B02C 18/067 241/101.761 |
| 5,413,286 A * | 5/1995 | Bateman | B02C 13/04 241/190 |
| 5,439,039 A * | 8/1995 | Bradstreet, Jr. | B27L 11/005 144/162.1 |
| 5,524,518 A * | 6/1996 | Sundstrom | B23D 61/025 83/835 |
| 5,529,249 A * | 6/1996 | Braun | B02C 13/06 241/32 |
| 5,570,849 A | 11/1996 | Anderson | |
| 5,611,496 A * | 3/1997 | Fleenor | B02C 13/28 241/166 |
| 5,927,624 A | 7/1999 | Hughes | |
| 5,941,467 A * | 8/1999 | McArdle | B02C 13/288 241/5 |
| 5,967,436 A * | 10/1999 | Balvanz | B02C 13/2804 241/195 |
| 6,000,554 A | 12/1999 | Hughes | |
| RE36,486 E | 1/2000 | Hughes | |
| 6,045,072 A * | 4/2000 | Zehr | B02C 13/2804 241/189.1 |
| 6,058,989 A * | 5/2000 | LaGrange | B27L 11/005 144/218 |
| 6,058,992 A * | 5/2000 | Stager | B27L 11/005 144/222 |
| 6,131,838 A * | 10/2000 | Balvanz | B02C 13/2804 241/195 |
| 6,227,469 B1 * | 5/2001 | Daniels, Jr. | B02C 13/06 241/186.3 |
| 6,293,481 B1 * | 9/2001 | Ragnarsson | B02C 18/146 241/197 |
| 6,364,227 B1 * | 4/2002 | Dorscht | B02C 13/2804 241/197 |
| 6,419,173 B2 * | 7/2002 | Balvanz | B02C 13/2804 241/195 |
| 6,494,394 B1 * | 12/2002 | Balvanz | B02C 13/2804 241/191 |
| 6,533,200 B2 * | 3/2003 | Paper | B02C 18/145 241/197 |
| 6,565,026 B1 * | 5/2003 | Hall | B02C 18/2291 241/225 |
| 6,663,275 B2 | 12/2003 | Knight | |
| 7,121,485 B2 * | 10/2006 | Smith | B02C 13/06 241/55 |
| 7,159,626 B2 * | 1/2007 | Biller | B27G 13/04 144/176 |
| 7,293,729 B2 * | 11/2007 | Ragnarsson | B02C 18/18 241/197 |
| 7,438,097 B2 * | 10/2008 | Davis | B02C 13/2804 144/174 |
| 7,487,931 B2 | 2/2009 | Monyak | |
| 7,584,918 B1 * | 9/2009 | Briggs, Jr. | B02C 13/13 241/197 |
| 7,743,803 B2 * | 6/2010 | Paumier | A01G 23/067 144/24.12 |
| 7,753,302 B2 * | 7/2010 | Zollig | B02C 13/28 241/195 |
| 8,434,705 B2 * | 5/2013 | Lipowski | B02C 18/18 241/29 |
| 8,602,336 B2 * | 12/2013 | Boliver | B27L 11/005 241/92 |

(56) References Cited

U.S. PATENT DOCUMENTS

| | | | | |
|---|---|---|---|---|
| 8,708,263 | B2* | 4/2014 | Young | B21K 5/00 241/195 |
| 10,099,224 | B2* | 10/2018 | Peterson | B02C 18/145 |
| 2001/0040198 | A1* | 11/2001 | Rossler | B02C 18/145 241/294 |
| 2003/0155038 | A1* | 8/2003 | Stager | B27L 11/007 144/373 |
| 2003/0201029 | A1* | 10/2003 | Robitaille | B27L 11/007 144/235 |
| 2004/0155131 | A1* | 8/2004 | Bardos | B02C 18/14 241/189.1 |
| 2004/0238666 | A1* | 12/2004 | Gray | B02C 13/2804 241/197 |
| 2005/0156459 | A1* | 7/2005 | Roozeboom | B02C 18/145 299/39.8 |
| 2005/0263624 | A1* | 12/2005 | Sharp | B28D 1/188 241/27 |
| 2006/0016304 | A1* | 1/2006 | Monyak | B02C 13/2804 83/13 |
| 2007/0125445 | A1* | 6/2007 | Watts | B02C 18/184 144/176 |
| 2008/0061176 | A1* | 3/2008 | Smith | B02C 13/288 241/189.1 |
| 2008/0314645 | A1* | 12/2008 | Hall | E21B 10/43 175/374 |
| 2009/0008488 | A1* | 1/2009 | Willibald | B27L 11/005 241/191 |
| 2010/0044487 | A1* | 2/2010 | Labbe | B02C 18/146 241/293 |
| 2010/0058917 | A1* | 3/2010 | Scandroglio | B23D 43/06 83/840 |
| 2010/0102155 | A1* | 4/2010 | Na | B02C 18/0084 241/107 |
| 2010/0123034 | A1* | 5/2010 | Engnell | B27L 11/005 241/291 |
| 2011/0062266 | A1* | 3/2011 | Smith | B02C 18/145 241/291 |
| 2011/0192926 | A1* | 8/2011 | Roessler | B02C 18/145 241/189.1 |
| 2011/0204171 | A1* | 8/2011 | Craven | B02C 13/28 241/197 |
| 2013/0008991 | A1* | 1/2013 | Morey | B02C 21/02 241/282.2 |
| 2013/0306775 | A1* | 11/2013 | Cairns | A01G 23/067 241/285.1 |
| 2014/0001297 | A1* | 1/2014 | Kessler | B02C 18/14 241/221 |
| 2014/0165812 | A1* | 6/2014 | Jacques | B23D 61/06 83/835 |
| 2015/0040395 | A1* | 2/2015 | Delapierre | F01D 5/3092 29/889.1 |
| 2015/0129699 | A1* | 5/2015 | Schlief | B02C 18/184 241/292.1 |
| 2015/0251188 | A1* | 9/2015 | Wada | B02C 18/142 241/227 |
| 2015/0298209 | A1* | 10/2015 | Vempati | B22D 19/06 164/76.1 |
| 2015/0327437 | A1* | 11/2015 | Mixon | A01D 45/10 56/16.4 C |
| 2016/0325462 | A1* | 11/2016 | Pallmann | B27L 11/005 |
| 2017/0106375 | A1* | 4/2017 | Gaudreault | B02C 18/145 |
| 2017/0203302 | A1* | 7/2017 | Fredsall | B02C 18/184 |
| 2017/0297032 | A1* | 10/2017 | Denis | B02C 18/18 |
| 2018/0043366 | A1* | 2/2018 | Van Gemert | E02F 3/965 |
| 2018/0229244 | A1* | 8/2018 | Kimbell | B02C 18/18 |
| 2018/0290149 | A1* | 10/2018 | Ver Steeg | B02C 18/18 |

OTHER PUBLICATIONS

Photograph of comminuter implement in the bottom of a comminuter sold by Universal Refiner Corporation before Aug. 28, 1997. (1 page).

* cited by examiner

IMPACT CUTTER BLADE AND HOLDER SYSTEM AND METHOD

TECHNICAL FIELD

The present disclosure generally relates to an Impact Cutter Blade and Holder system and method. More particularly, the present disclosure relates to an Impact Cutter Blade and Holder system and method that reduces maintenance and improves performance by protecting its components from collisions with comminution material.

DESCRIPTION OF THE RELATED ART

There exists a need in many industries to reduce large pieces of solid material to a particulate form. For instance, in managing wood and tree waste, it is desirable to grind stumps, branches, and wood scraps into smaller wood chips. Wood chips are more easily and efficiently transported, stored, and used for a variety of purposes. In other instances, it is desirable to reduce large pieces of waste material, such as plastic, for recycling or disposal. In still other instances, it is desirable to reduce pieces of rock, metal, asphalt, or other extremely hard material, for disposal.

Refiners of various size and operation are generally available for performing this function. One style of refiner includes a refining chamber defined by a sidewall and a bottom floor at one end of the sidewall. An annular ring in the same plane and surrounding the bottom floor is attached to the sidewall and rotates with the sidewall. For instance, a refiner of this style may include a comminuting chamber in which a rotatably-mounted cutter disk with attached blades impacts solid material introduced into the chamber and reduces the material to particulate form.

Some such refiners operate by rotating both the chamber sidewall and the bladed cutter disk, sometimes in the same direction, and sometimes in opposite directions. The rotation of the sidewall imparts rotational motion to the solid material placed in the chamber. As the material in the chamber rotates with the chamber sidewall, the material comes into contact with the rotating cutter disk. The blades of the cutter disk impact the material, thereby ripping and tearing the material into successively smaller pieces. The annular portion of the bottom of the chamber that rotates with the sidewall typically includes a screened exit through which the material, once refined to a particular size, may pass out of the chamber.

The old style blades of the cutter disks were held in place by a "backer" (i.e., a short hardened key stock) and a "keeper" (i.e., a hardened wedge). In prior blade and swing lock holder assemblies, a blade was inserted into a slot of the holder, and then wedged into place. The various components of these traditional cutter disks would become damaged on a regular basis due to the constant collision with the comminution material. When the various components of these traditional cutter disks had to be replaced or repaired due to damage from the comminution material, the maintenance costs were sizeable and the maintenance time periods were protracted.

There is a continuing need in the art for a cutter disk and associated components that are more protected from impact damage caused by the comminution material and contaminates in the material, which results in increased maintenance and reduced performance of the refiner.

Notably, all of the subject matter discussed in this section is not necessarily prior art and should not be assumed to be prior art merely as a result of its discussion in this section. Accordingly, any recognition of problems in the prior art discussed in this section or associated with such subject matter should not be treated as prior art unless expressly stated to be prior art. Instead, the discussion of any subject matter in this section should be treated as part of the identification of the technological problem to be overcome, which in and of itself may also be inventive.

BRIEF SUMMARY

An impact cutter blade and holder system may be summarized as including a cutter disk having a central axis about which the cutter disk is configured to rotate; a plurality of impact holders, wherein each of the plurality of impact holders is secured to the cutter disk; a plurality of impact cutter blades, wherein an associated impact cutter blade of the plurality of impact cutter blades is secured to an associated impact holder of the plurality of impact holders; and a plurality of wear slugs, wherein an associated wear slug of the plurality of wear slugs is secured to the associated impact holder of the plurality of impact holders, and wherein the associated wear slug is securely positioned to shield the associated impact holder of the plurality of impact holders from damage by comminution material.

Each of the plurality of impact holders may contain a holder bolt hole for receiving a blade bolt, and a blade mounting slot for receiving a held end of an impact cutter blade. The associated impact holder of the plurality of impact holders may include a push-slug bolt, wherein the push-slug bolt tightens the associated wear slug in place. The associated impact cutter blade of the plurality of impact cutter blades may have a leading edge positioned to collide with the comminution material and a trailing edge opposite the leading edge, wherein the associated impact cutter blade may have a cutter end that is located away from the associated impact holder and a held end that is secured in the associated impact holder. The associated impact cutter blade of the plurality of impact cutter blades may contain a blade bolt hole for securing the associated impact cutter blade to the associated impact holder using the blade bolt hole, wherein a blade bolt is positioned through the blade bolt hole. The associated impact cutter blade of the plurality of impact cutter blades may be secured through the blade bolt hole of the associated impact cutter blade to the associated impact holder using the blade bolt and a stepped nut, wherein the stepped nut has a lower portion and a stepped portion that is raised higher than the lower portion of the stepped nut, wherein the stepped portion of the stepped nut contacts the associated impact cutter blade on a trailing edge of the blade bolt hole.

A hex hole may secure the stepped nut which enables the blade bolt to be removed with a single wrench. The associated impact cutter blade of the plurality of impact cutter blades may include a ridge that runs along a length of the associated impact cutter blade and acts as a fulcrum when the associated impact cutter blade is secured in a blade mounting slot of the associated impact holder. The blade bolt may be tightened against the stepped nut, which generates leverage against the fulcrum that forces a leading edge of the associated impact cutter blade against a forward opposite side of the blade mounting slot in the associated impact holder. The leverage may provide tension that keeps the blade bolt from coming loose.

The associated wear slug of the plurality of wear slugs may be mounted to the associated impact holder via a machine fit, wherein the push-slug bolt tightens the associated wear slug in place. The associated wear slug of the plurality of wear slugs may be larger in diameter at the push-slug bolt than the associated impact holder, wherein the associated wear slug presents a larger profile to incoming comminution material than the associated impact holder, wherein the associated wear slug protects the associated impact holder by shielding the associated impact holder from collisions with the incoming comminution material that would otherwise damage the associated impact holder. The associated wear slug that may be mounted on the associated impact holder may only expose a third of a circumference of the associated wear slug to collision with the comminution material, wherein the associated wear slug is rotatable to at least three separate positions while shielding the associated impact holder, each position representing a third of the circumference of the associated wear slug.

An impact cutter blade and holder system may be summarized as including a cutter disk having a central axis about which the cutter disk is configured to rotate; a plurality of impact holders, wherein each of the plurality of impact holders is secured to the cutter disk; a plurality of impact cutter blades, wherein an associated impact cutter blade of the plurality of impact cutter blades is secured to an associated impact holder of the plurality of impact holders; and a disk wear cover plate secured to the cutter disk, wherein the disk wear cover plate is shaped and sized to shield the cutter disk and the secured plurality of impact holders from damage by comminution material.

The impact cutter blade and holder system may further include a plurality of impact tabs, wherein an associated impact tab of the plurality of impact tabs is secured by an impact tab securing notch between the associated impact holder and a trailing edge of associated impact cutter blade, wherein the associated impact tab of the plurality of impact tabs is securely positioned in the impact tab slot to shield the associated impact holder from the trailing edge of the associated impact cutter blade due to collision of the associated impact cutter blade with the comminution material. Each of the plurality of impact holders may contain a holder bolt hole for receiving a blade bolt, and a blade mounting slot for receiving a held end of the associated impact cutter blade.

The associated impact holder may further include an impact tab slot for locating the associated impact tab, wherein the impact tab slot is wider than the trailing edge of the associated impact cutter blade. The associated impact cutter blade of the plurality of impact cutter blades may have a leading edge positioned to collide with the comminution material and a trailing edge opposite the leading edge, wherein the associated impact cutter blade has a cutter end that is located away from the associated impact holder and a held end that is secured in the associated impact holder. The associated impact cutter blade of the plurality of impact cutter blades may include an impact tab securing notch on the trailing edge of the associated impact cutter blade. The associated impact cutter blade of the plurality of impact cutter blades may contain a blade bolt hole for securing the associated impact cutter blade to the associated impact holder using the blade bolt hole, wherein a blade bolt is positioned through the blade bolt hole. The associated impact cutter blade of the plurality of impact cutter blades may be secured through the blade bolt hole of the associated impact cutter blade to the associated impact holder using the blade bolt and a stepped nut, wherein the stepped nut has a lower portion and a stepped portion that is raised higher than the lower portion of the stepped nut, wherein the stepped portion of the stepped nut contacts the associated impact cutter blade on a trailing edge of the blade bolt hole.

A hex hole may secure the stepped nut which enables the blade bolt to be removed with a single wrench. The associated impact cutter blade of the plurality of impact cutter blades may include a ridge that runs along a length of the associated impact cutter blade and acts as a fulcrum when the associated impact cutter blade is secured in a blade mounting slot of the associated impact holder. The blade bolt may be tightened against the stepped nut, which generates leverage against the fulcrum that forces a leading edge of the associated impact cutter blade against a forward opposite side of the blade mounting slot in the associated impact holder. The leverage may provide tension that keeps the blade bolt from coming loose. The associated impact tab of the plurality of impact tabs may shield the associated impact holder from damage caused by the trailing edge of the associated impact cutter blade when the associated impact cutter blade encounters the comminution material. The associated impact tab may be positioned in an impact tab securing notch in the trailing edge of the associated impact cutter blade, between the associated impact cutter blade and the associated impact holder, wherein the associated impact tab is positioned in an impact tab slot of the associated impact holder.

A leading end of the associated impact tab may abut the impact tab securing notch in the trailing edge of the associated impact cutter blade, while a trailing end of the associated impact tab may abut the impact tab slot of the associated impact holder. The associated impact cutter blade of the plurality of impact cutter blades may have an impact tab securing notch with a 90-degree angle in a trailing edge of the associated impact cutter blade that holds the associated impact tab in place, wherein the 90-degree angle of the impact tab securing notch enables the associated impact tab to support the associated impact cutter blade against forces in multiple directions. The associated impact tab of the plurality of impact tabs may have a larger width than a trailing edge of the associated impact cutter blade, wherein the larger width of the associated impact tab spreads out and diminishes forces transmitted by the associated impact cutter blade towards the associated impact holder due to collision of the associated impact cutter blade with the comminution material. The associated impact tab of the plurality of impact tabs may be formed from a metallic alloy that is softer than the associated impact holder such that force from the associated impact cutter blade deforms the associated impact tab before the associated impact holder. The disk wear cover plate may be secured to the cutter disk using plate mounting bolts, wherein the disk wear cover plate reduces friction, energy consumption, and fuel consumption since collision against the disk wear cover plate by the comminution material is oblique rather than direct.

An impact cutter blade clamping method using an impact cutter blade and holder system, the impact cutter blade and holder system including a cutter disk, a plurality of impact holders, and an impact cutter blade, wherein the cutter disk has a central axis about which the cutter disk is configured to rotate, wherein each of the plurality of impact holders is secured to the cutter disk, and wherein the impact cutter blade includes a leading edge that is positioned to intersect with comminution material when the cutter disk rotates, wherein the method may be summarized as including positioning a ridge on at least one of an impact cutter blade sidewall or a blade mounting slot sidewall of an associated impact holder of the plurality of impact holders; placing the impact cutter blade in the blade mounting slot of the associated impact holder; clamping, using a blade bolt, the impact cutter blade to the associated impact holder and against the ridge, which acts as a fulcrum that reduces vibration and provides increased rigidity at the leading edge of the impact cutter blade; and generating leverage against the fulcrum that forces the leading edge of the associated impact cutter blade against a forward opposite sidewall of the blade mounting slot in the associated impact holder. The blade bolt may be tightened against a stepped nut that is positioned opposite of the ridge on at least one of an impact cutter blade sidewall or a blade mounting slot sidewall of an associated impact holder of the plurality of impact holders.

BRIEF DESCRIPTION OF THE SEVERAL VIEWS OF THE DRAWINGS

The present disclosure will be more fully understood by reference to the following figures, which are for illustrative purposes only. These non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. The figures do not describe every aspect of the teachings disclosed herein and do not limit the scope of the claims.

DETAILED DESCRIPTION

Persons of ordinary skill in the art will understand that the present disclosure is illustrative only and not in any way limiting. Other embodiments of the presently disclosed system and method readily suggest themselves to such skilled persons having the assistance of this disclosure.

Each of the features and teachings disclosed herein can be utilized separately or in conjunction with other features and teachings to provide an impact cutter blade and holder system and method. Representative examples utilizing many of these additional features and teachings, both separately and in combination, are described in further detail with reference to attached FIGS. 1-6. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 1:
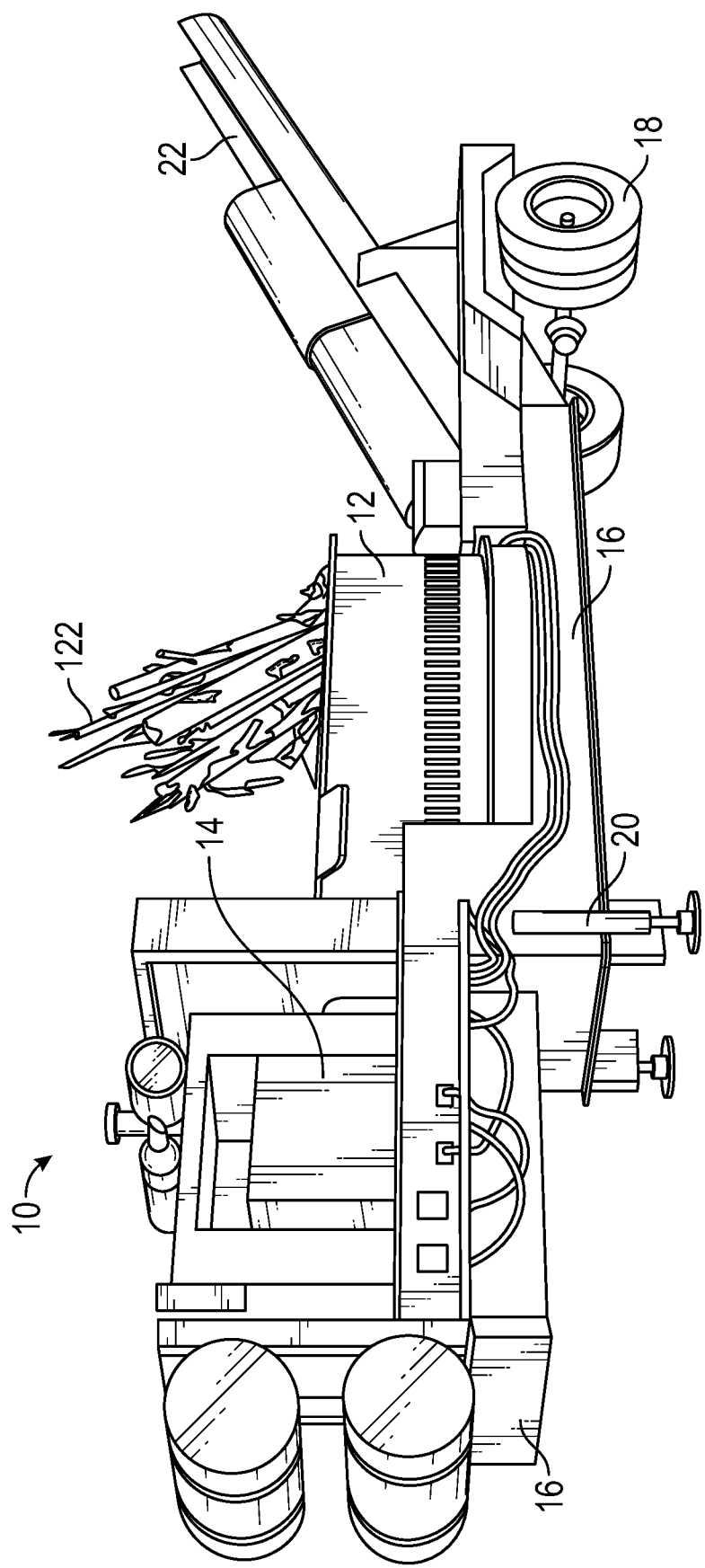
FIG. 1 is a perspective view of one exemplary embodiment of a pan and cutter disk refiner.

Referring now to FIG. 1, in one embodiment of the present disclosure, the impact cutter blade and holder system is implemented as a refiner, which may be constructed in accordance with the present disclosure.

Alternatively, the impact cutter blade and holder system may also be embodied in a variety of other forms. Typically, a refiner will include a refiner chamber, a cutter disk, an engine that powers the refiner chamber and cutter disk, and a conveyor that carries away the refined material that has exited the refiner chamber. FIG. 1 is a perspective side view of one exemplary embodiment of such a refiner.

The refiner 10 depicted in FIG. 1 includes a rotating refiner chamber 12 and a rotating bladed cutter disk located inside the chamber 12. The refiner 10 includes an engine 14 that powers the operation of the refiner 10. The engine 14 is typically a diesel engine, but other types of engines, such as a gasoline engine, may be used. Alternatively, or in addition, other power sources, including electric and hydraulic motors, may be used to operate the refiner 10. The refiner chamber 12 and the engine 14 are mounted on a frame 16 that preferably has wheels 18. The wheels 18 allow the frame 16 to be transported from one job site to another. Adjustable jack legs 20 mounted at an end of the frame 16 opposite the wheels 18 may be used to maintain the refiner 10 in a level position.

In one embodiment, the refiner 10 further includes a conveyor 22 that collects and carries away particulate material discharged from the refiner chamber 12. The conveyed particulate material may be deposited in a pile on the ground, in the bed of a truck, and the like. Conventional components may be used to construct the conveyor 22 including belt systems, augers, or other mechanisms capable of conveying the particulate matter from the refiner chamber 12. See, e.g., the reciprocating screening conveyor described in U.S. Pat. No. 6,000,554, assigned to the assignee of the present disclosure and incorporated by reference herein.

Referring now to FIGS. 2A-6, the impact cutter blade and holder system and method provides a major technological improvement that reduces operating costs, reduces maintenance, and improves performance. In some embodiments of the impact cutter blade and holder system 100, the impact cutter blade and holder system 100 includes a cutter disk 110; a plurality of impact holders 130; a plurality of impact cutter blades 150, wherein an impact cutter blade 150 is attached to each impact holder 130; a plurality of wear slugs 180, wherein a wear slug 180 is attached to each impact holder 130; a plurality of impact tab 190, wherein an impact tab 190 is secured between each impact holder 130 and associated impact cutter blade 150; and a disk wear cover plate 200. Notably, the cutter disks 110 of the impact cutter blade and holder system 100 may be used in other applications such as attachments for excavators, wheel loaders, tractors, and the like, as well as portable axle or track mounted stump grinders.

Figure 2A:
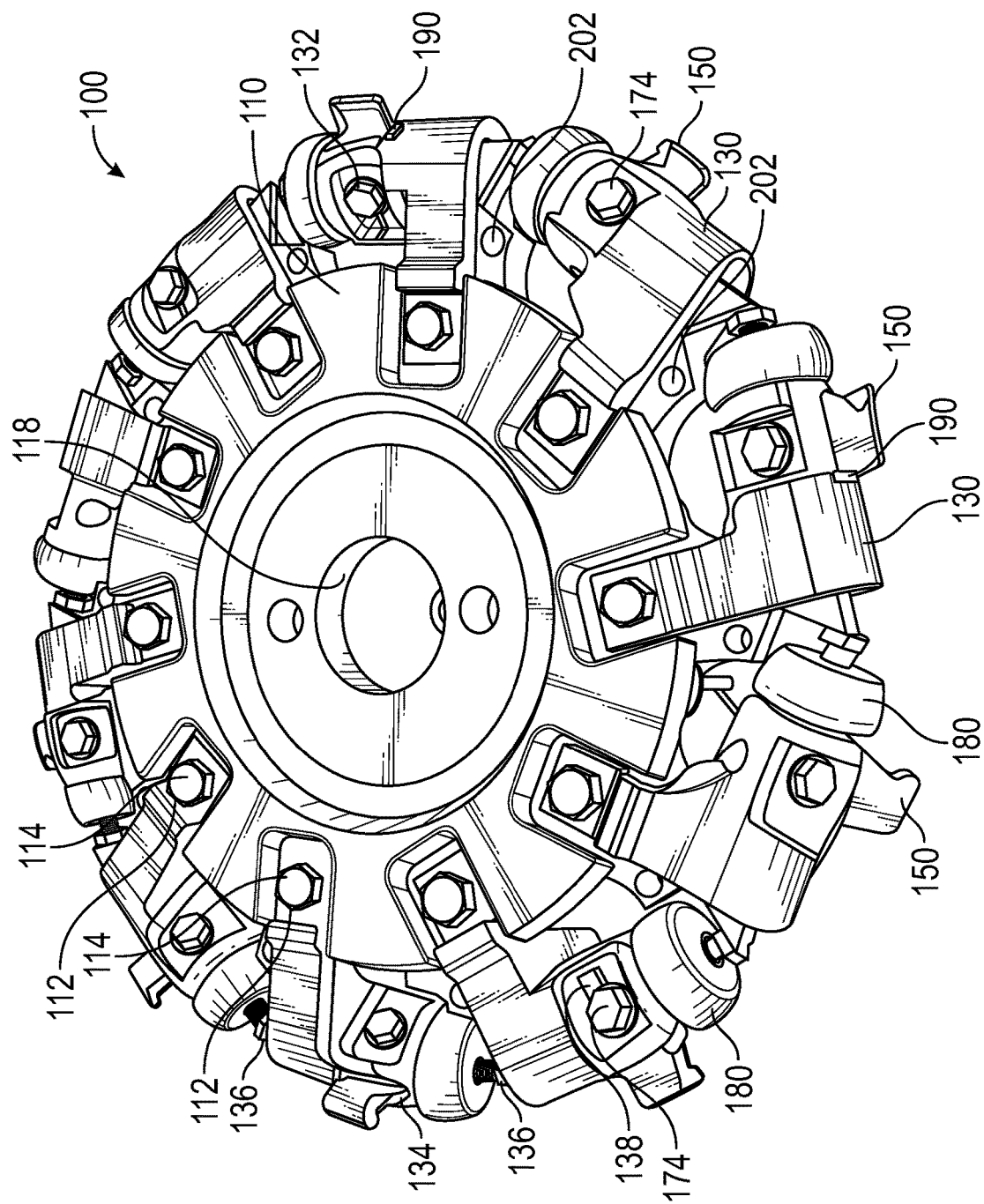
FIG. 2A is a perspective view of an embodiment of the impact cutter blade and holder system including a cutter disk, impact holders, impact cutter blades, wear slugs, and impact tabs.
Figure 2B:
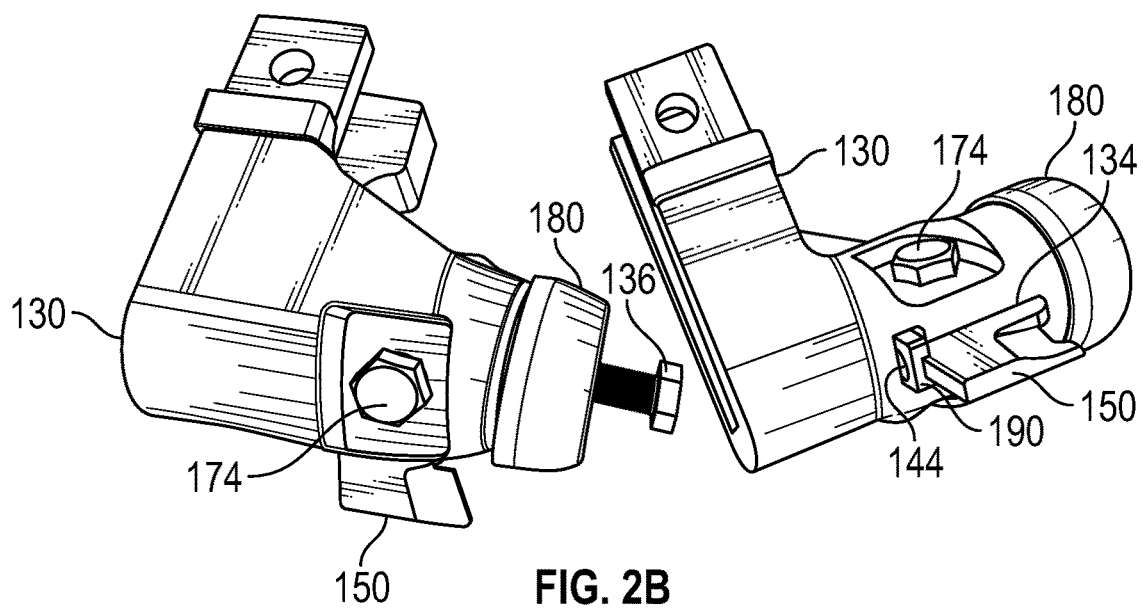
FIG. 2B is a perspective view of two impact holders, each with an attached impact cutter blade, wear slug, and impact tab.

The impact cutter blade and holder system 100 is retrofitable to most cutter disks manufactured since 1990. As shown in FIGS. 2A-2B, the impact holders 130 of the impact cutter blade and holder system 100 secure to the cutter disk 110 in the same way as the traditional "swing lock holders." However, the impact holders 130 of the impact cutter blade and holder system 100 are attached to wear slugs 180 that provide protection to the impact holders 130 from comminution material 122, e.g., rock, wood (See FIG. 1), metal, asphalt, and the like, unlike the traditional "swing lock holders," which provided no such protection. The impact cutter blades 130 of the impact cutter blade and holder system 100 secure to the impact holders 130 with the assistance of impact tabs 190 that provide protection to the impact holders 130, unlike the traditional "old style blades," which provided no such protection.

Referring now to FIG. 2A, the cutter disk 110 of the impact cutter blade and holder system 100 contains a plurality of through bolt holes 112 for receiving through bolts 114. In one embodiment, the holder mounting bracket is somewhat horseshoe-shaped. Additionally, the cutter disk 110 of the impact cutter blade and holder system 100 contains a central axis hole 118 for receiving a central axle (not shown). Further, the cutter disk 110 of the impact cutter blade and holder system 100 contains a plurality of cover plate holes 202 for securing the disk wear cover plate (described below).

As shown in FIGS. 2A and 2B, each of the plurality of impact holders 130 of the impact cutter blade and holder system 100 is connected to the cutter disk 110 using a through bolt 114. Additionally, each impact holder 130 contains a holder bolt hole 132 for receiving a blade bolt. A hex nut is used to secure the blade bolt on the underside of the impact holder 130. The impact holder 130 of the impact cutter blade and holder system 100 also contains a blade mounting slot 134 for receiving a held end of an impact cutter blade 150, as described in further detail below.

Continuing, each impact holder 130 contains a push-slug bolt 136, wherein the push-slug bolt 136 tightens the associated wear slug 180 in place, as described in further detail below. The associated wear slug is mounted on the leading side of the associated impact holder via a machine fit. In at least one embodiment, each push-slug bolt 136 is tightened to 300-350 ft. lbs. of torque. Notably, the push-slug bolt 136 replaces a push bolt in traditional "swing lock holders" that was only used to reduce circumferential swing.

Figure 3A:
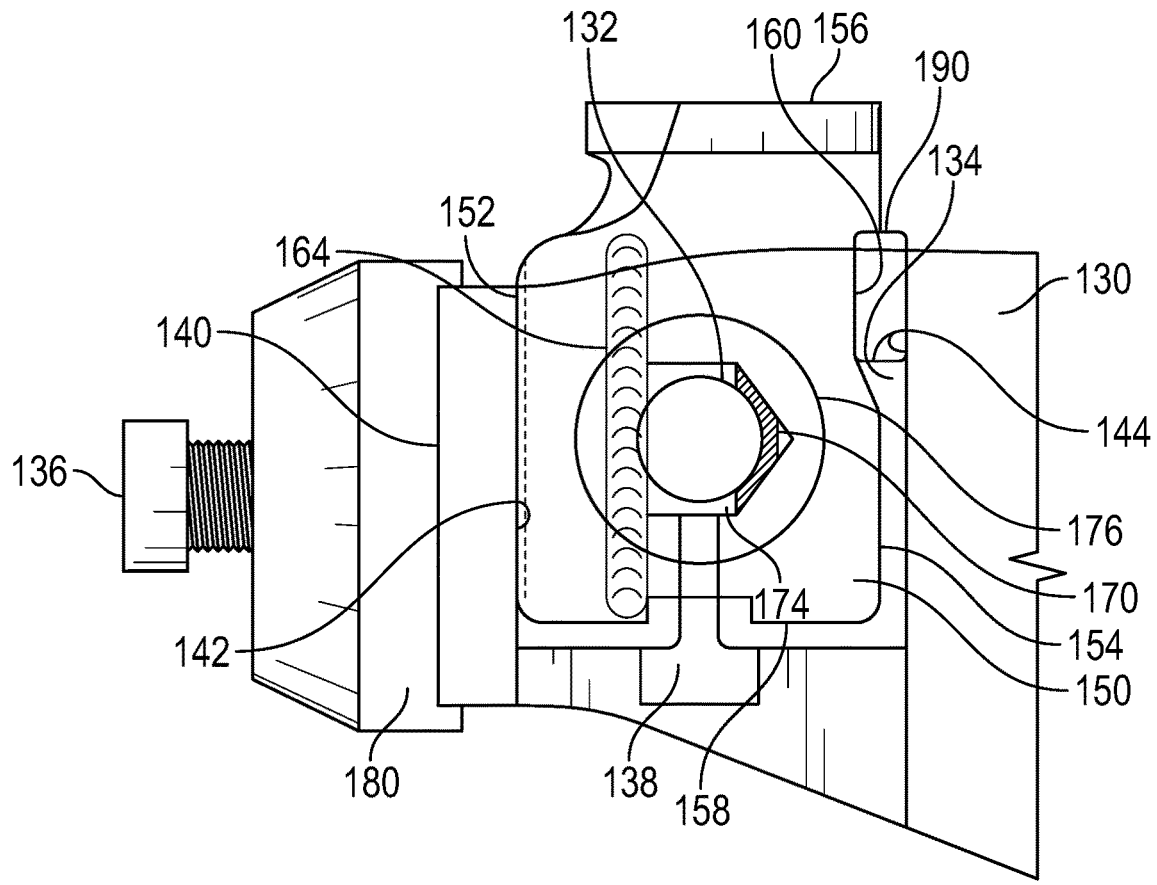
FIG. 3A is a top view of a portion of an impact holder, with an attached impact cutter blade, blade bolt, stepped nut, blade washer, wear slug, and impact tab.

As shown in FIG. 3A, the impact holder 130 of the impact cutter blade and holder system 100 includes a blade removal slot 138, through which a lever may be used to remove the impact cutter blade 150 from the impact holder 130. Continuing, the impact holder 130 includes a front-side contact point 140 that abuts against the trailing end of the wear slug 180. Additionally, the impact holder 130 of the impact cutter blade and holder system 100 includes a back-side contact point 142 which abuts against the leading edge of the impact cutter blade 150 that is being secured by the impact holder 130.

In some embodiments, the impact holder 130 further includes an impact tab locating notch 144 for locating an impact tab 190, as shown in FIG. 3C-3F. Notably, the impact tab locating notch 144 is about twice as wide as the trailing edge of the impact cutter blade 150 to correspond with the width of the impact tab 190, which is about twice as wide as the trailing edge of the impact cutter blade 150. In another embodiment, the impact tab locating notch 144 is more than twice as wide as the trailing edge of the impact cutter blade 150 to correspond with the width of the impact tab 190, which is more than twice as wide as the trailing edge of the impact cutter blade 150. In another embodiment, the impact tab locating notch 144 is at least 150% as wide as the trailing edge of the impact cutter blade 150 to correspond with the width of the impact tab 190, which is at least 150% as wide as the trailing edge of the impact cutter blade 150. Additionally, since the impact holders 130 of the impact cutter blade and holder system 100 are fabricated from thicker plate than the old style holders, the impact holder 130 of the impact cutter blade and holder system 100 is stronger, heavier, and more massive than the old style holders.

Referring now to FIGS. 2A, 2B, 3A, and 3B, the plurality of impact cutter blades 150 in the impact cutter blade and holder system 100 each have a leading edge 152 (that collides with the comminution material 122) and a trailing edge 154 (opposite the leading edge 152, and away from direction of travel of the cutter disk 110). Additionally, each impact cutter blade 150 in the impact cutter blade and holder system 100 has a cutter end 156 (that is positioned to impact with the comminution material 122) and a held end 158 (that is secured in the impact holder 130). In some embodiments, the plurality of impact cutter blades 150 in the impact cutter blade and holder system 100 each includes an impact tab securing notch 160 on the trailing edge 154. Each of the plurality of impact cutter blades 150 contains a blade bolt hole 162 for securing the impact cutter blade 150 to its associated impact holder 130 using the holder bolt hole 132 and a blade bolt.

Figure 3B:
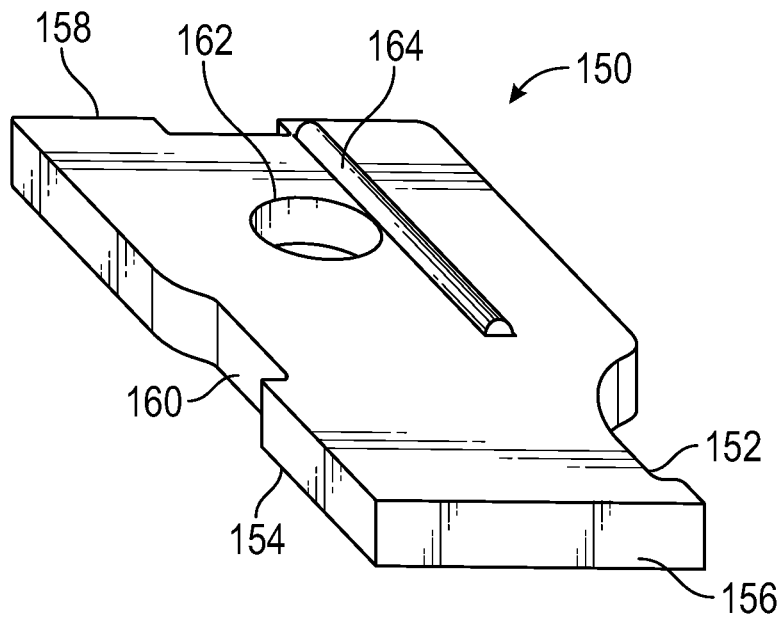
FIG. 3B is a perspective view of impact cutter blade shown in FIG. 3A.
Figure 3C:
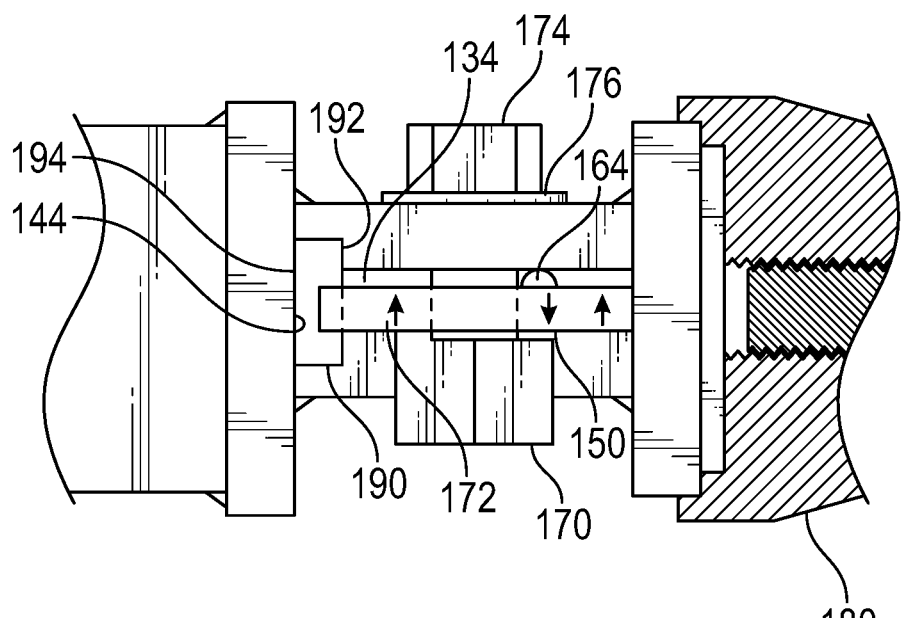
FIG. 3C is an end view of a wear slug, push-slug bolt, thick impact cutter blade with a top-side fulcrum, impact holder, impact tab, blade bolt hole, and a stepped nut.
Figure 3D:
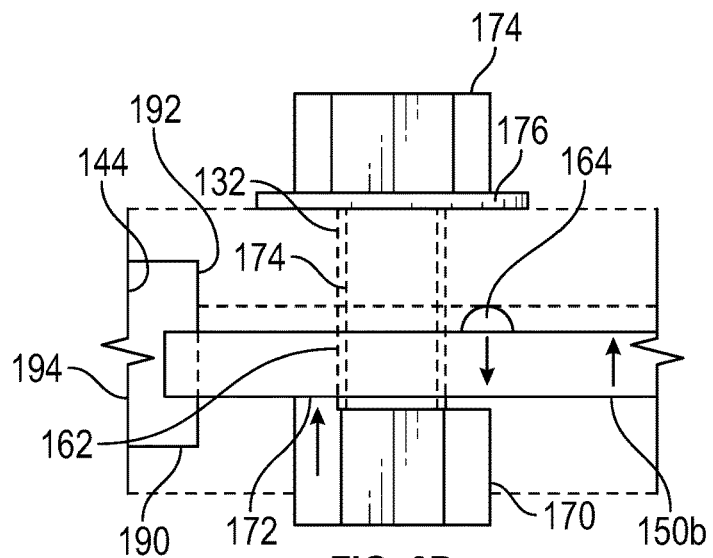
FIG. 3D is an end view of a thick impact cutter blade with a top-side fulcrum, impact holder, impact tab, blade bolt hole, and a stepped nut.
Figure 3E:
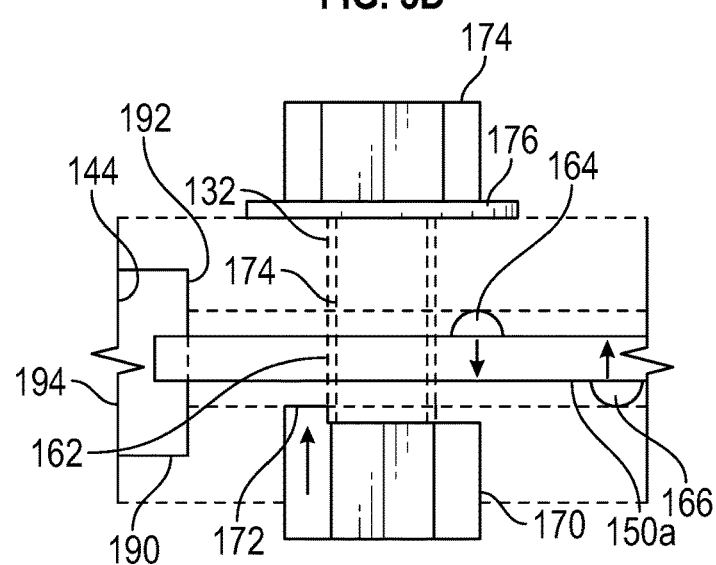
FIG. 3E is an end view of a thin impact cutter blade with a top-side fulcrum and a bottom-side fulcrum, impact holder, impact tab, blade bolt hole, and a stepped nut.

Referring specifically to FIGS. 3A-3F, in some embodiments of the impact cutter blade and holder system 100, each impact cutter blade 150 contains a fulcrum 164 (e.g., pivot weld, ridge, or the like) that runs along the length of the impact cutter blade 150 (from the held end 158 to the cutter end 156). In some embodiments of the impact cutter blade and holder system 100 that employ a thinner 10 mm impact cutter blade 150*a*, the impact cutter blade 150 contains a bottom-side ridge 166 (e.g., pivot weld, or other fulcrum) on the opposite side of the leading edge 152 of the held end 158 (as shown in FIG. 3E). This bottom-side ridge 166 enables one size of impact holder 130 to work for both a thicker impact cutter blade 150*b* (as shown in FIG. 3D) and the thinner impact cutter blade 150*a* (as shown in FIG. 3E). The bottom-side ridge 166 provides a contact line that opposes the fulcrum 164 (e.g., pivot weld, ridge, or the like), while the stepped nut 170 forces the thinner impact cutter blade 150*a* to compensate for the difference in thickness (from a thicker impact cutter blade 150*b*).

In some embodiments of the impact cutter blade and holder system 100, the fulcrum 164 is located on the impact cutter blade 150 (i.e., the fulcrum is a raised portion of the impact cutter blade 150). In such an embodiment, the fulcrum 164 (e.g., pivot weld, ridge, or the like) is made of a softer metal than the impact holder 130. As such, the fulcrum 164 (e.g., pivot weld, ridge, or the like) does not damage the impact holder 130. The fulcrum 164 (e.g., pivot weld, ridge, or the like) may be replaced at the same time of every impact cutter blade 150 change.

Figure 3F:
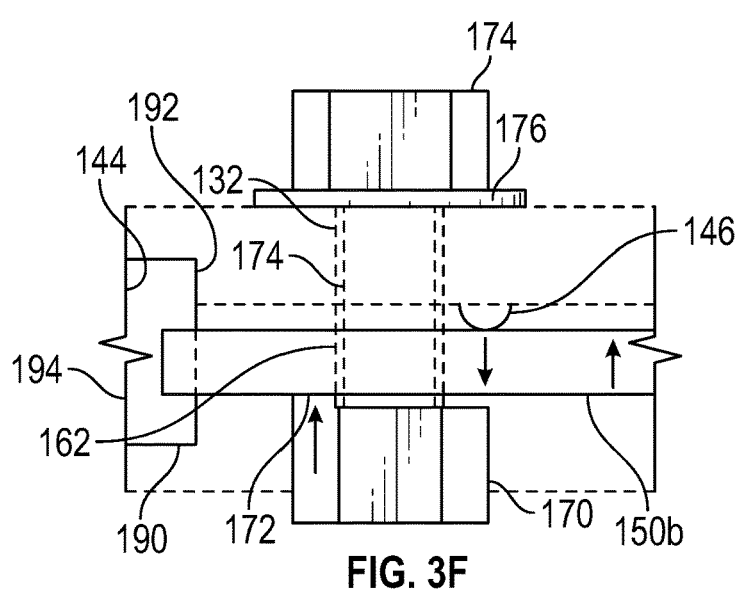
FIG. 3F is an end view of an impact cutter blade without a fulcrum, impact holder with a bottom-facing fulcrum on the of the top side of the blade mounting slot, impact tab, blade bolt hole, and a stepped nut.

Alternatively, in other embodiments of the impact cutter blade and holder system 100, the holder fulcrum 146 (e.g., pivot weld, ridge, or the like) is located on the impact holders 130 (i.e., the fulcrum is a raised portion inside the impact holder 130), as shown in FIG. 3F. The holder fulcrum 146 is a bottom-facing fulcrum on the top side of the blade mounting slot. Thus, this alternative embodiment employs a fulcrum 146 (e.g., pivot weld, ridge, or the like) as part of the impact holder 130 instead of as part of impact cutter blade 150. Notably, in this alternative embodiment, the fulcrum 146 (e.g., pivot weld, ridge, or the like) may become damaged more quickly because the impact cutter blade 150 is made of a very hard material that would tend to damage a fulcrum 146 (e.g., pivot weld, ridge, or the like) on the inside of the impact holder 130 more quickly due to the hardness of the impact cutter blade 150. In some embodiments, the impact holder 130 has a very long life span, while the impact cutter blade 150 is replaced more frequently since it is absorbing the majority of the damage from the comminution material 122. In various embodiments, the impact cutter blades 150 and impact holders 130 may be formed by fabrication, casting, forging, forming, and/or any other type of manufacture.

Referring now to another aspect of some embodiments as shown in FIGS. 3A and 3C-3F, the impact cutter blade and holder system 100 further employs a plurality of stepped nuts 170. Each stepped nut 170 is used to assist in securing an impact cutter blade 150 to an impact holder 130. The stepped nut 170 has as lower portion and a stepped portion 172 that is raised higher than the lower portion of the stepped nut 170. In some embodiments, the stepped portion 172 of the stepped nut 170 abuts the impact cutter blade 150 on the trailing edge of the blade bolt hole 162 (i.e., the side of the blade bolt hole 162 closest to the trailing edge 154 of the impact cutter blade 150, away from the direction of travel of the cutter disk 110).

Notably, in such an embodiment, the stepped nut 170 causes the clamping of the impact cutter blade 150 in its associated impact holder 130. As the blade bolt 174 is tightened against stepped nut 170, leverage is generated against the fulcrum 164 (e.g., pivot weld, ridge, or the like) which forces the leading edge 152 of the impact cutter blade 150 against the forward opposite side of the blade mounting slot 134 in the impact holder 130. This force clamps the impact cutter blade 150 securely in place and eliminates any possible vibration of the held end 158 of the impact cutter blade 150. Continuing, this force deforms the impact cutter blade 150 under extreme spring tension. This tension assures that the stepped nut 170, the blade bolt 174, and the impact cutter blade 150 do not work loose. This is similar to the effect of a lock washer.

Referring now to FIG. 3B, the leading edge 152 of the impact cutter blade 150 is where nearly all of the impact with the comminution material 122 is received. As such, the point of maximum rigidity is at or in front of the leading edge 152 of the impact cutter blade 150. The leading edge 152 of the impact cutter blade 150 lies at or near the extended line of the fulcrum 164 (e.g., pivot weld, ridge, or the like) and the opposing leading edge to provide the needed strength and rigidity.

As the impact cutter blade 150 wears, the leading edge 152 of the impact cutter blade 150 recedes, but the point of maximum rigidity remains at or in front of the leading edge 152 of the impact cutter blade 150. As the impact cutter blade 150 slices through the comminution material 122, the impact cutter blade 150 tracks with the comminution material 122 as long as the point of maximum rigidity remains in front of the extended line of the fulcrum 164 (e.g., pivot weld, ridge, or the like).

As the blade bolt 174 and stepped nut 170 are tightened, the impact cutter blade 150 is deformed under tension forces to prevent vibration. At the same time, the fulcrum 164 (e.g., pivot weld, ridge, or the like) and opposing leading side become wedged inside the impact holder 130, giving maximum strength to the leading edge 152 of the impact cutter blade 150 where it is needed.

In still another aspect of some embodiments, the impact cutter blade and holder system 100 includes a blade bolt 174 and a blade washer 176. In at least one specific, non-limiting embodiment, the blade bolt 174 is a Grade 8 fine thread bolt. In some embodiments, the blade bolt 174 is tightened to about 400-500 ft. lbs. of torque. In some embodiments, the blade washer 176 is a Grade 8 SAE washer. Notably, the impact cutter blade and holder system 100 does not require the use of a lock washer on the blade bolt 174, since the stepped nut 170 is held by the hex hole provided, and blade tension holds the blade bolt 174 and impact cutter blade 150 in place.

In some embodiments of the impact cutter blade and holder system 100, each impact cutter blade 150 is held in place with a single bolt (e.g., the blade bolt 174) and a single nut (i.e., the stepped nut 170). In other embodiments, more than one set of blade bolts 174, blade bolt holes 162, and stepped nuts 170 are used to fasten a single impact cutter blade 150 to a single impact holder 130.

In one specific, non-limiting embodiment, the blade bolt 174 is a 1.0 inch×2.5 inches Grade 8 hex cap screw NF (national fine thread). This Grade 8 hex cap screw is a medium carbon alloy tempered steel bolt that is used where hardness and high strength are desired. In another aspect of a specific, non-limiting embodiment, the blade washer 176 is a 1.0 inch SAE (Society of Automotive Engineers) flat washer. In still another aspect of a specific, non-limiting embodiment, the stepped nut 170 is a 1.0 inch NF hardened high nut with one end shaved away so that only one side portion presses against the impact cutter blade 150.

In some embodiments of the impact cutter blade and holder system 100, the stepped nut 170 is held from turning by the hex hole so the blade bolt 174 can be removed with only one wrench. The side of the impact holder 130 fits the hex shape of the stepped nut 170 and prevents the stepped nut 170 from turning. Notably, battery powered impact wrenches are now available with enough power to remove and install the blade bolts 174, making the change of the impact cutter blade 150 very efficient.

Referring now to FIGS. 4A-4K, the impact cutter blades 150 are available in a variety of shapes and sizes. Specifically, in various embodiments of the impact cutter blade and holder system 100, many different styles of cutter ends 156 are employed on various implementations of impact cutter blades 150 depending on the nature and properties of the comminution material 122 that is expected to be encountered. The cutter end 156 of the impact cutter blades 150 may be long or short, dull or sharp, depending on the material to be cut.

Figure 4A:
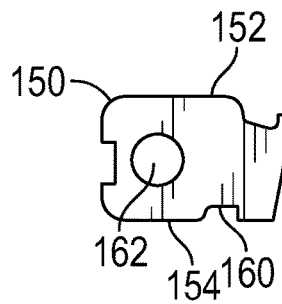
FIGS. 4A-4K are top views of various examples of impact cutter blade for various type of comminution materials.
Figure 4B:
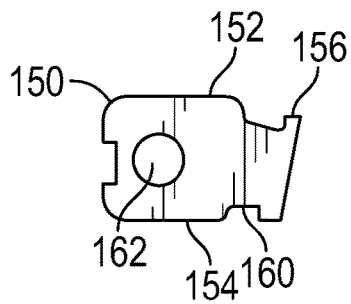
Figure 4C:
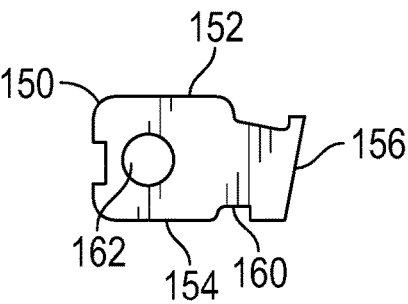
Figure 4D:
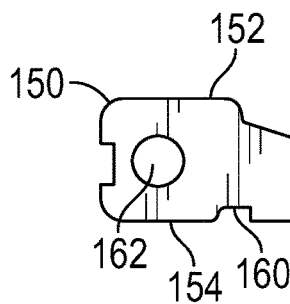
Figure 4E:
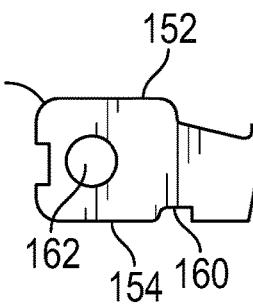
Figure 4F:
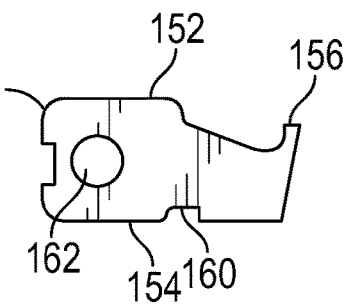

FIG. 4A illustrates an impact cutter blade 150 (impact super hardwood) having a cutter end 156 that is the shortest and strongest blade depicted, and is configured for very hard wood, frozen wood and contaminates such as rock and steel. FIG. 4B illustrates an impact cutter blade 150 (impact hardwood) having a cutter end 156 that is the second strongest blade depicted, and is configured for hardwoods and lesser contaminates. FIG. 4C illustrates an impact cutter blade 150 (impact softwood) having a cutter end 156 that is the third strongest blade depicted, and is configured for softwoods and lesser contaminates. FIG. 4D illustrates an impact cutter blade 150 (impact ripper) having a cutter end 156 that is the fourth strongest blade depicted, and is configured for high production in softer, lighter materials. FIG. 4E illustrates an impact cutter blade 150 (impact long ripper) having a cutter end 156 that is the fifth strongest blade depicted, and is configured for very high production in lighter materials. FIG. 4F illustrates an impact cutter blade 150 (impact raker) having a cutter end 156 that is very long, and is configured for clearing grates and higher production.

Figure 4G:
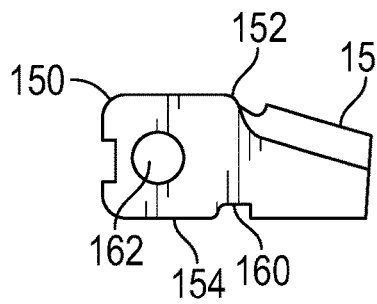
Figure 4H:
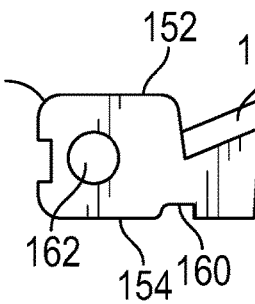
Figure 4I:
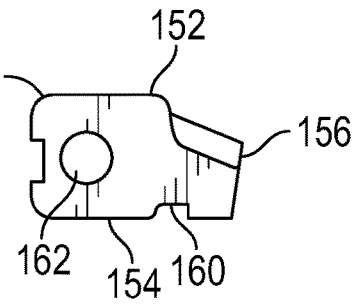
Figure 4J:
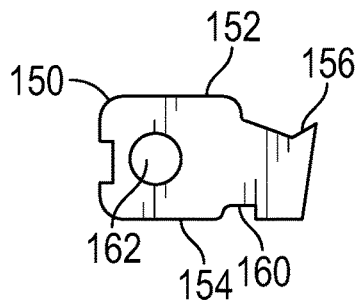
Figure 4K:
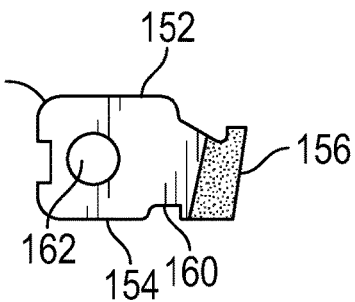

FIG. 4G illustrates an impact cutter blade 150 (impact slicer) having a cutter end 156 that is very long with a knife edge, and is configured for higher production in fibrous materials. FIG. 4H illustrates an impact cutter blade 150 (impact tbc-chipper) having a cutter end 156 that is a very aggressive blade with a knife edge, and is configured for higher production in fibrous materials when less blade strength is required. FIG. 4I illustrates an impact cutter blade 150 (knife edge) having a cutter end 156 that has a sharp leading edge, and is configured for fibrous materials. FIG. 4J illustrates an impact cutter blade 150 (chisel point) having a cutter end 156 that has a sharp chisel point, and is configured for fiberglass and dense plastics. FIG. 4K illustrates an impact cutter blade 150 (club) having a cutter end 156 that has massive hardfacing, and is configured for asphalt shingles.

In some embodiments of the impact cutter blade and holder system 100, the impact cutter blades 150 are more massive than previous swing blades in at least two ways. First, the impact cutter blades 150 of the impact cutter blade and holder system 100 are thicker than previous swing blades (0.5 inches for the impact cutter blade 150 compared to 0.375 inches for the previous swing blades). Second, the impact cutter blades 150 of the impact cutter blade and holder system 100 are wider at the cutter end 156 (where they extend out of the impact holder 130). In one embodiment, the width at the cutter end 156 of the impact cutter blade 150 is 3.25 inches (compared to 2.5 inches for the previous swing blades). The strength of the impact cutter blade 150 to resist breakage at the cutter end 156 of the impact cutter blade 150 (i.e., the point at which the impact cutter blade 150 extends from the impact holder 130) is relative to the width times the square of the thickness (i.e., for the old style blades the strength is 2.5×0.375× 0.375=0.352; for the new impact cutter blade 150 the strength is 3.25×0.5×0.5=0.8125). In some embodiments, the metallic alloy employed for the impact cutter blade 150 possesses about 220,000 psi (tensile strength). Accordingly, the impact cutter blade 150 is more than twice as strong as previous swing lock blades.

Referring now to FIGS. 2A, 2B, 3A, 3C, and 5, in another aspect of some embodiments, the impact cutter blade and holder system 100 includes a plurality of wear-absorbing components called wear slugs 180 on the leading side of each impact holder 130. The wear slug 180 is larger than the impact holder 130 in diameter and, thus, in the profile that is presented to incoming comminution material 122. Accordingly, the wear slug 180 absorbs most of the wear that the impact holder 130 would otherwise receive from collision with the comminution material 122.

Specifically, the wear slug 180 has a profile that is larger than the profile of the impact holder 130 (with respect to its contact with the comminution material 122 that can cause wear). In this regard, the comminution material 122 advances toward the circumference of the cutter disk 110 while the cutter disk 110 revolves at a high speed. The impact holder 130 is in the "shadow" of the wear slug 180 so that the surfaces of the impact holder 130 only have minimal contact with the comminution material 122, while the wear slug 180 takes the full impact of the comminution material 122 that is encountered. In one embodiment, the wear slug 180 is 4.5 inches in diameter, while the holder profile is 4.0 inches in diameter. Thus, the wear slug 180 extends 0.25 inches further toward the comminution material 122 than the impact holder 130 in all directions. The typical advance of the comminution material 122 towards the impact holder 130 (in the direction of travel) is about 0.197 inches (which is less than the 0.25 inches that the wear slug 180 extends beyond the impact holder 130).

In some embodiments, the wear slug 180 can be turned (rotated) to three positions (each position representing a third of the wear slug's circumference) before the wear slug 180 becomes worn out. The wear slug 180 is easily removed from the impact holder 130 and cutter disk 110 by loosening the push-slug bolt 136, and can be rehardfaced and reused. This dramatically reduces the amount and difficulty of maintenance required for the impact holder 130, since the wear slug 180 is absorbing the vast amount of the damage which would previously have been imparted onto the impact holder 130.

In one embodiment, the wear slug 180 is turned by loosening the push-slug bolt 136 with a 1.5 inches end wrench. The wear slug 180 is then turned manually and the push-slug bolt 136 is re-tightened. This configuration and adaptability enable a new wear surface of the wear slug 180 to be presented to the direction of travel three times before the wear slug 180 must be replaced.

Figure 5:
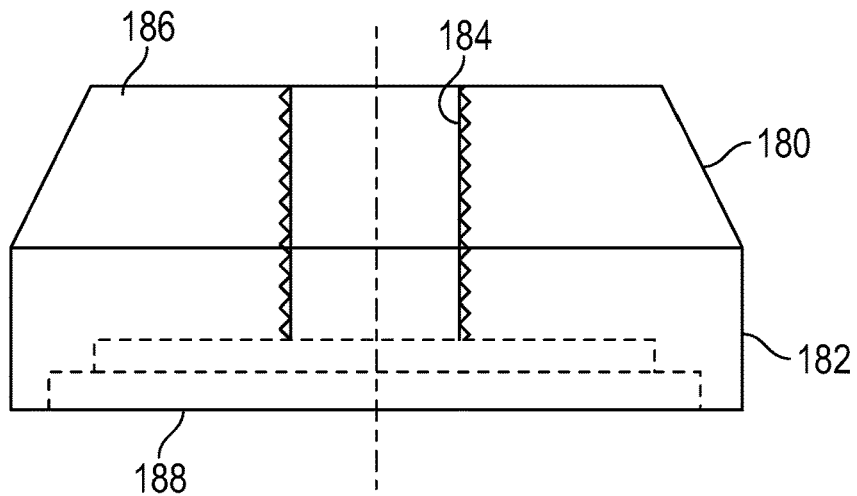
FIG. 5 is a top view of a wear slug.

Referring now to FIG. 5, in one specific, non-limiting embodiment, the outer diameter 182 of the wear slug 180 is 4.5 inches, and the inner diameter 184 of the wear slug 180 that mounts over the push-slug bolt 136 is 1.0 inches. In this specific, non-limiting embodiment, the leading edge 186 of the wear slug 180 is 3.5 inches and the trailing edge 188 of the wear slug 180 is countersunk twice. In this embodiment, the first countersink is 0.25 inches deep and has a 4.0 inches diameter, and the second countersink is an additional 0.25 inches deep and has a 3.5 inches diameter. Notably, these countersinks provide the technological improvement of assisting with the mount and center of the wear slug 180 on the leading end of the impact holder 130 (i.e., the end of the impact holder 130 in the direction of travel).

As described above, the outer diameter 182 of the wear slug 180 extends beyond the impact holder 130 to protect the impact holder 130 from comminution material 122 as the wear slug 180, impact cutter blade 150, and impact holder 130 rotate in the direction of travel of the cutter disk 110 into the comminution material 122. Thus, the impact holder 130 travels in the shadow of the wear slug 180 and is protected from the majority of the impact with the comminution material 122. Accordingly, the outer portion of the wear slug 180 (which is furthest from the central axis hole of the wear slug) receives the vast majority of the impact with the comminution material 122 to about one third of the wear slug 180. Thus, the wear slug 180 may be rotated on the push-slug bolt 136 into three approximate positions (i.e., thirds of the wear slug circumference) before the wear slug 180 needs to be replaced or resurfaced.

In some embodiments, the wear slug 180 is made using a CNC (computer numerical control) lathe machine. Notably, the wear slug 180 may be made from mild steel and hard-faced, since a rough finish is acceptable for the use of the wear slug 180. Hard-facing is a metalworking process where harder or tougher material is applied to a base metal to harden and toughen the surface of the base material.

Referring now to FIGS. 2A, 2B, 3A, and 3C-3F, in another aspect of some embodiments, the impact cutter blade and holder system 100 includes a plurality of impact tabs 190. In such embodiments, the impact cutter blade and holder system 100 incorporate a plurality of impact tabs 190 that protects the impact holders 130 from excessive damage caused by the trailing edge 154 of the impact cutter blades 150 when encountering comminution material 122 (e.g., large pieces of metal). In previous systems, the impact of comminution material 122 could swing (rotate) the impact cutter blade 150 and cause damage to the portion of the blade mounting slot 134 of the impact holder 130 that abuts with the trailing edge 154 of the impact cutter blade 150. Specifically, in previous systems the impact of the comminution material 122 with the leading edge 152 of the impact cutter blade 150 caused the impact cutter blade 150 to swing back in the opposite direction of the rotational travel of cutter disk 110 and damage an old style holder.

The impact tab 190 has a leading end 192 and a trailing end 194 (opposite the leading end 192, away from direction of travel). The impact tab 190 is positioned in an impact tab securing notch 160 in the trailing edge 154 of the impact cutter blade 150, between the impact cutter blade 150 and the impact holder 130. The impact tab 190 is positioned in an impact tab locating notch 144 of the impact holder 130. Thus, the leading end 192 of the impact tab 190 abuts the impact tab securing notch 160 in the trailing edge 154 of the impact cutter blade 150, while the trailing end 194 of the impact tab 190 abuts the impact tab locating notch 144 of the impact holder 130.

As shown in FIGS. 3A and 3C-3F, in the impact cutter blade and holder system 100, the trailing edge 154 of the impact cutter blade 150 is supported by the impact tab 190. Specifically, the impact cutter blade 150 has an impact tab securing notch 160 in its trailing edge 154 that holds the impact tab 190 in place. The 90-degree angle of this impact tab securing notch 160 enables the impact tab 190 to support the impact cutter blade 150 against both radial force and tangential forces generated by impact of the impact cutter blade 150 with the comminution material 122 (which impacts the impact cutter blade 150 at many different angles).

Impact tab locating notch 144 of the impact holder 130, which is where the impact tab 190 fits into the impact holder 130, is wider than the blade mounting slot 134 in the impact holder 130 for receiving the impact bade 150. The back of the impact tab locating notch 144 of the impact holder 130 serves to support the impact component that is pushing the trailing edge of the impact bade 150 back into the impact holder 130. With the impact tab 190 taking both components of the impact, the blade bolt 174 is protected from these forces. However, if the impact tab 190 is not employed, the blade bolt 174 will receive all of these forces, and will have to be more robust to handle these forces.

In one embodiment, the impact tab 190 is placed in the impact tab securing notch 160 in the trailing edge 154 of impact cutter blade 150 when the impact cutter blade 150 is inserted into the impact holder 130. Specifically, the impact tab 190 is positioned in an impact tab locating notch 144 of the impact holder 130. As the impact force (of the impact cutter blade 150 against the comminution material 122) swings the impact cutter blade 150 back in the opposite direction of the cutter disk's rotational travel about its central axis hole 118, the impact tab 190 is pinched between the trailing edge 154 of impact cutter blade 150 and the bearing surface (i.e., the impact tab locating notch 144) in the blade mounting slot 134 of the impact holder 130.

The impact tab locating notch 144 engages the impact tab 190 to prevent the force of the impact (of the impact cutter blade 150 against the comminution material 122) from pushing the trailing edge 154 of impact cutter blade 150 into the blade mounting slot 134 of the impact holder 130. This force is countered by the impact tab locating notch 144 inside the blade mounting slot 134 of the impact holder 130 that bears against the impact tab 190. Additionally, the 90-degree angle of this impact tab securing notch 160 (FIG. 3A) enables the impact tab 190 to support the impact cutter blade 150 against additional forces (radial, normal, tangential, and the like) generated by impact of the impact cutter blade 150 with the comminution material 122, which drive inward along the trailing edge 154 of impact cutter blade 150.

In some embodiments, the impact tab 190 is a small piece of a metallic alloy that can be replaced when the impact cutter blade 150 is changed. Notably, the impact tab 190 can be reused if it is not damaged. A technological improvement of the impact cutter blade and holder system 100 is that the impact tab 190 protects the blade mounting slot 134 of the impact holder 130 from damage from the trailing edge 154 of the impact cutter blade 150 due to collision with comminution material 122.

In some embodiments, the impact tab 190 is formed from the same metallic alloy as the impact cutter blade 150. In other embodiments, the impact tab 190 is formed from a metallic alloy that is slightly softer than the impact holder 130, thus resulting in the impact tab 190 deforming before the impact holder 130 (or impact cutter blade 150), which is desirable since the impact tab 190 is easier (and more cost efficient) to replace. Accordingly, the easily replaceable impact tab 190 is constructed to be damaged instead of the blade mounting slot 134 of the impact holder 130.

In some embodiments, the impact tab 190 is twice as wide as the trailing edge 154 of the impact cutter blade 150. The impact tab 190 protects the impact holder 130 from being damaged/deformed by the trailing edge 154 of the impact cutter blade 150, since the trailing edge 154 of the impact cutter blade 150 is driven towards the impact holder 130 by collision with the comminution material 122. The extended width of the impact tab 190 (compared to the trailing edge 154 of the impact cutter blade 150) spreads out (and thereby diminishes) the force of the trailing edge 154 of the impact cutter blade 150 towards the impact holder 130 by collision with the comminution material 122.

Notably, since the impact tab 190 presents twice as much surface area to the bearing surface (impact tab locating notch 144) of the impact holder 130 as the trailing edge 154 of the impact cutter blade 150, the impact cutter blade 150 forcibly abuts against the impact tab 190. The doubled surface area of the impact tab 190 against the blade mounting slot 134 of the impact holder 130 reduces the impacting force by half. Therefore, the impact tab 190 becomes deformed instead of the blade mounting slot 134 of the impact holder 130.

Figure 6:
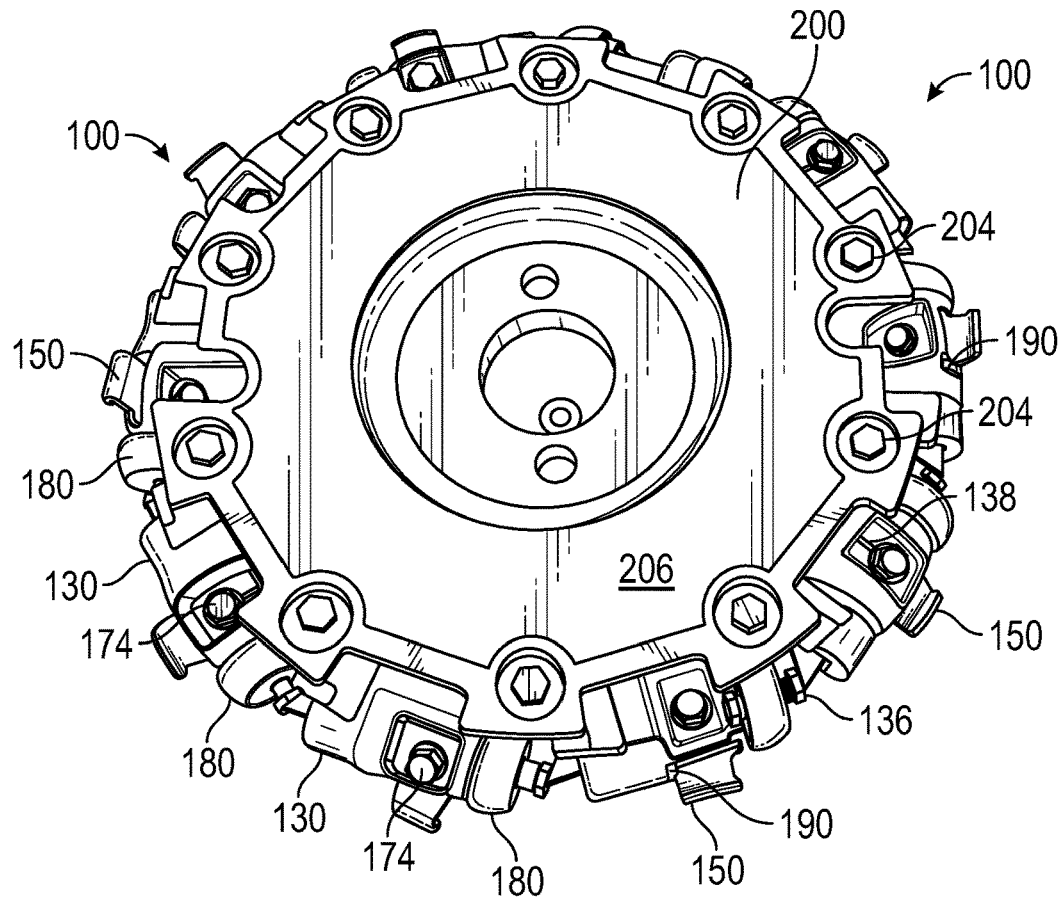
FIG. 6 is a perspective view of an embodiment of the impact cutter blade and holder system including a cutter disk, impact holders, impact cutter blades, wear slugs, impact tabs, and a disk wear cover plate.

Referring now to FIG. 6, in another aspect of some embodiments, the impact cutter blade and holder system 100 includes disk wear cover plate 200. In one embodiment, the disk wear cover plate 200 is formed from a metallic alloy that covers the entire top surface of the cutter disk 110 and the impact holders 130. The disk wear cover plate 200 is mounted to the cutter disk 110 using the cover plate holes 202 (shown in FIG. 1) and plate mounting bolts 204 that align with cover plate holes 202 in the cutter disk 110. In one embodiment, the plate mounting bolts 204 are tightened to 400-500 ft. lbs. of torque. The disk wear cover plate 200 has an upper surface 206 (away from the cutter disk 110) that comes into contact with comminution material 122. Additionally, the disk wear cover plate 200 has a lower surface (not shown) facing the cutter disk 110 that does not come into contact with comminution material 122. Notably, the disk wear cover plate 200 has a smooth surface. Furthermore, the disk wear cover plate 200 does not require the strength levels of the other parts described herein since contact/collision of the disk wear cover plate 200 with the comminution material 122 tends to be tangential rather than direct.

Since the disk wear cover plate 200 does not receive as much impact (with the comminution material 122) as the impact holders 130 and impact cutter blade 150, in some embodiments the disk wear cover plate 200 is made of a wear-resistant alloy that is harder (but not as high strength as the cutter blade 110. This type of wear-resistant alloy is less expensive than the high strength alloys (of which the cutter disk 110, impact holders 130, and impact cutter blades 150 are typically made), thus, making the disk wear cover plate 200 more practical as a replaceable part.

A significant, unexpected technological benefit of the disk wear cover plate 200 is that its upper surface 206 is much flatter and smoother than the bare cutter disk 110. This flat, smooth surface of the disk wear cover plate 200 drastically reduces friction, energy consumption (e.g., horsepower requirements), and fuel burn since contact/collision of the disk wear cover disk 200 with the comminution material 122 is oblique rather than direct. Without the implementation of the disk wear cover plate 200, the top surface of the cutter disk 110 and the top side of the impact holders 130 had to be regularly repaired due to damage from impact with comminution material 122. In some embodiments, the disk wear cover plate 200 is removable and can be rehardfaced and reused. Notably, the disk wear cover plate 200 almost completely eliminates the hardfacing maintenance of the cutter disk 110 and the top side of the impact holders 130.

Another implementation of an impact cutter blade and holder system 100 is intended mostly for smaller machines that are operated in materials that have low abrasive content. In this implementation, the impact holders are formed as part of the cutter disk by welding (or otherwise securing) holder blocks to produce a one-piece cutter disk. The "holder blocks" have all the features of an impact holder to secure an associated impact cutter blade. In some embodiments, the holder blocks are welded to the cutter disk at various angles then hardfaced to produce finished holder blocks.

In at least one implementation, the one-piece cutter disk is made by welding the holder blocks into a solid cutter disk at various angles. The one-piece cutter disk provides a technological improvement of increased production efficiency. However, the one-piece cutter disk typically must be removed from the refiner for hardfacing maintenance, instead of only removing the impact holders, wear plates, and wear slugs. In some embodiments, the one-piece cutter disk is held in place with a wing nut. Tree service companies are an example where the comminution material 122 (e.g., stumps chunks and tree limbs) is relatively free of harder contaminates. In this tree service implementation, the one-piece cutter disk may only need maintenance after months of service, whereas in a garbage service implementation, maintenance may be required on a weekly or even daily basis due to the prevalence of harder contaminates and comminution material 122.

In still other alternate embodiments of the impact cutter blade and holder system 100, the shape of the impact cutter blades 150 are modified, but the manner in which the impact cutter blades 150 are clamped to reduce vibration and provide maximum rigidity at the leading edge 152 or cutting point is maintained. The following embodiments describe several approaches by which the impact cutter blades 150 and impact holders 130 can be produced that provide the technological improvements associated with clamping to reduce vibration and provide maximum rigidity at the leading edge 152 of the impact cutter blades 150.

In a first alternate embodiment of impact cutter blade and holder system 100, the blade bolt hole 162 through the impact cutter blade 150 is moved closer to the trailing edge 154. This movement of the blade bolt hole 162 closer to the trailing edge 154 of the impact cutter blade 150 enables a nut to be employed for securing the blade bolt 174 which provides the proper clamping without the need for the nut to be a stepped nut. However, this configuration with the blade bolt hole 162 moved closer to the trailing edge 154 of the impact cutter blade 150 would not be as strong since the blade bolt 174 must be smaller in this location (due to space limitations).

In a second alternate embodiment of impact cutter blade and holder system 100, each impact cutter blade 150 includes two blade bolt holes 162 which are secured with corresponding stepped nuts 172 to generate proper clamping, which reduces vibration and provides maximum rigidity at the leading edge 152 of the impact cutter blades 150. In still another implementation, the two blade bolt holes 162 are positioned closer to the trailing edge 154 of the impact cutter blades 150 (as described above in the first alternate embodiment) and provide the proper clamping without stepped nuts.

In a third alternate embodiment of impact cutter blade and holder system 100, the holder fulcrum 146 (e.g., pivot ridge) is located in the blade mounting slot 134 of the impact holders 130 (instead of on the impact cutter blade 150). The holder fulcrum 146 is a bottom-facing fulcrum on the top side of the blade mounting slot 134. This alternate embodiment may also include an opposite side contact fulcrum or pivot ridge 166 on the impact cutter blade 150 as shown on the thin impact cutter blade 150a in FIG. 3E. In another embodiment, the pivot ridge 166 is a replaceable pin-like shape that is separate from the impact holder 130 and the impact cutter blade 150. In still another implementation, the pivot ridge 166 is a piece of key stock that is position in a groove of the impact holder 130 and/or the impact cutter blade 150.

In a fourth alternate embodiment of impact cutter blade and holder system 100, the impact cutter blade 150 does not have a blade bolt hole 162 in it. Rather, the clamping force is provided by a bolt that is threaded into the impact holder 130, with the point of the threaded bolt transmitting pressure at a correct spot. In still another implementation, the impact cutter blade 150 has a small hole (or at least an indentation)

into which the threaded bolt could extend. Notably, these embodiments all employ the unique combination of a clamping action (to reduce vibration and provide maximum rigidity at the leading edge of the impact cutter blades), via a clamp point (or points), a pivot ridge, and an opposing leading edge contact line or ridge.

In some embodiments of an impact cutter blade and holder method, the clamping of the impact cutter blades 150 in the impact holders 130 achieves unique technological improvements. The combination of cooperating impact cutter blade details and impact holders details are used to achieve the proper clamping to reduce vibration and provide maximum rigidity at the leading edge of the impact cutter blades.

In some embodiments of the impact cutter blade and holder system 100, the impact cutter blade and holder system 100 includes a cutter disk 110; a plurality of impact holders 130; a plurality of impact cutter blades 150, wherein an impact cutter blade 150 is attached to each impact holder 130; and a plurality of wear slugs 180, wherein a wear slug 180 is attached to each impact holder 130.

In other embodiments of the impact cutter blade and holder system 100, the impact cutter blade and holder system 100 includes a cutter disk 110; a plurality of impact holders 130; a plurality of impact cutter blades 150, wherein an impact cutter blade 150 is attached to each impact holder 130; and a plurality of impact tabs 190, wherein an impact tab 190 is secured between each impact holder 130 and associated impact cutter blade 150.

In still other embodiments of the impact cutter blade and holder system 100, the impact cutter blade and holder system 100 includes a cutter disk 110; a plurality of impact holders 130; a plurality of impact cutter blades 150, wherein an impact cutter blade 150 is attached to each impact holder 130; and a disk wear cover plate 200.

Yet other embodiments are directed towards the impact holder 130 itself. In such an embodiment, the impact holder 130 secures to a cutter disk 110; an impact cutter blade 150, and an impact tab 190. The impact cutter blade 150 is attached to the impact holder 130, while the impact tab 190 is secured between the impact holder 130 and the impact cutter blade 150.

Certain words and phrases used in the specification are set forth as follows. As used throughout this document, including the claims, the singular form "a", "an", and "the" include plural references unless indicated otherwise. Any of the features and elements described herein may be singular, e.g., a sensor may refer to one sensor and a memory may refer to one memory. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this patent document.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the present disclosure.

Generally, unless otherwise indicated, the materials for making the invention and/or its components may be selected from appropriate materials such as metal, metallic alloys (high strength alloys, high hardness alloys), composite materials, ceramics, intermetallic compounds, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

The invention claimed is:

1. An impact cutter blade clamping method using an impact cutter blade and holder system, the impact cutter blade and holder system including a cutter disk, a plurality of impact holders, and an impact cutter blade, wherein the cutter disk has a central axis about which the cutter disk is configured to rotate, wherein each of the plurality of impact holders is secured to the cutter disk, and wherein the impact cutter blade includes a leading edge that is positioned to intersect with comminution material when the cutter disk rotates, the method comprising:
   positioning a ridge on at least one of an impact cutter blade sidewall or a blade mounting slot sidewall of an associated impact holder of the plurality of impact holders;
   placing the impact cutter blade in the blade mounting slot of the associated impact holder;
   clamping, using a blade bolt, the impact cutter blade to the associated impact holder and against the ridge, which acts as a fulcrum that reduces vibration and provides increased rigidity at the leading edge of the impact cutter blade; and
   generating leverage against the fulcrum that forces the leading edge of the associated impact cutter blade against a forward opposite sidewall of the blade mounting slot in the associated impact holder.

2. The method of claim 1, wherein the blade bolt is tightened against a stepped nut that is positioned opposite of the ridge on at least one of an impact cutter blade sidewall or a blade mounting slot sidewall of an associated impact holder of the plurality of impact holders.

3. An impact cutter blade and holder system, comprising:
a cutter disk having a central axis about which the cutter disk is configured to rotate;
a plurality of impact holders, wherein each of the plurality of impact holders is secured to the cutter disk, wherein each of the plurality of impact holders includes a blade mounting slot; and
a plurality of impact cutter blades, wherein an associated impact cutter blade of the plurality of impact cutter blades is secured to an associated impact holder of the plurality of impact holders using an associated blade mounting slot, wherein the associated impact cutter blade of the plurality of impact cutter blades includes a ridge that runs along a length of the associated impact cutter blade and acts as a fulcrum when the associated impact cutter blade is secured in the blade mounting slot of the associated impact holder.

4. The system of claim 3, wherein each of the plurality of impact holders includes an impact tab slot.

5. The impact cutter blade and holder system of claim 4, further comprising: a plurality of impact tabs, wherein an associated impact tab of the plurality of impact tabs is secured by an impact tab securing notch between the associated impact holder and a trailing edge of associated impact cutter blade, and wherein the associated impact tab of the plurality of impact tabs is securely positioned in the impact tab slot to shield the associated impact holder from the trailing edge of the associated impact cutter blade due to collision of the associated impact cutter blade with the comminution material.

6. The impact cutter blade and holder system of claim 3, wherein each of the plurality of impact holders contains a holder bolt hole for receiving a blade bolt, and a blade mounting slot for receiving a held end of the associated impact cutter blade.

7. The impact cutter blade and holder system of claim 3, wherein the associated impact holder further includes an impact tab slot for locating the associated impact tab, wherein the impact tab slot is wider than the trailing edge of the associated impact cutter blade.

8. The impact cutter blade and holder system of claim 3, wherein the associated impact cutter blade of the plurality of impact cutter blades has a leading edge positioned to collide with the comminution material and a trailing edge opposite the leading edge, wherein the associated impact cutter blade has a cutter end that is located away from the associated impact holder and a held end that is secured in the associated impact holder.

9. The impact cutter blade and holder system of claim 8, wherein the associated impact cutter blade of the plurality of impact cutter blades includes an impact tab securing notch on the trailing edge of the associated impact cutter blade.

10. The impact cutter blade and holder system of claim 3, wherein the associated impact cutter blade of the plurality of impact cutter blades contains a blade bolt hole for securing the associated impact cutter blade to the associated impact holder using the blade bolt hole, wherein a blade bolt is positioned through the blade bolt hole.

11. The impact cutter blade and holder system of claim 10, wherein the associated impact cutter blade of the plurality of impact cutter blades is secured through the blade bolt hole of the associated impact cutter blade to the associated impact holder using the blade bolt and a stepped nut, wherein the stepped nut has a lower portion and a stepped portion that is raised higher than the lower portion of the stepped nut, and wherein the stepped portion of the stepped nut contacts the associated impact cutter blade on a trailing edge of the blade bolt hole.

12. The impact cutter blade and holder system of claim 10, wherein a hex hole secures the stepped nut which enables the blade bolt to be removed with a single wrench.

13. The impact cutter blade and holder system of claim 11, wherein the associated impact cutter blade of the plurality of impact cutter blades includes a ridge that runs along a length of the associated impact cutter blade and acts as a fulcrum when the associated impact cutter blade is secured in a blade mounting slot of the associated impact holder.

14. The impact cutter blade and holder system of claim 13, wherein the blade bolt is tightened against the stepped nut, which generates leverage against the fulcrum that forces a leading edge of the associated impact cutter blade against a forward opposite side of the blade mounting slot in the associated impact holder.

15. The impact cutter blade and holder system of claim 14, wherein the leverage provides tension that keeps the blade bolt from coming loose.

16. The impact cutter blade and holder system of claim 3, wherein the associated impact tab of the plurality of impact tabs shields the associated impact holder from damage caused by the trailing edge of the associated impact cutter blade when the associated impact cutter blade encounters the comminution material.

17. The impact cutter blade and holder system of claim 3, wherein the associated impact tab is positioned in an impact tab securing notch in the trailing edge of the associated impact cutter blade, between the associated impact cutter blade and the associated impact holder, and wherein the associated impact tab is positioned in an impact tab slot of the associated impact holder.

18. The impact cutter blade and holder system of claim 17, wherein a leading end of the associated impact tab abuts the impact tab securing notch in the trailing edge of the associated impact cutter blade, while a trailing end of the associated impact tab abuts the impact tab slot of the associated impact holder.

19. The impact cutter blade and holder system of claim 3, wherein the associated impact cutter blade of the plurality of impact cutter blades has an impact tab securing notch with a 90-degree angle in a trailing edge of the associated impact cutter blade that holds the associated impact tab in place, wherein the 90-degree angle of the impact tab securing notch enables the associated impact tab to support the associated impact cutter blade against forces in multiple directions.

20. The impact cutter blade and holder system of claim 3, wherein the associated impact tab of the plurality of impact tabs has a larger width than a trailing edge of the associated impact cutter blade, wherein the larger width of the associated impact tab spreads out and diminishes forces transmitted by the associated impact cutter blade towards the associated impact holder due to collision of the associated impact cutter blade with the comminution material.

21. The impact cutter blade and holder system of claim 3, wherein the associated impact tab of the plurality of impact tabs is formed from a metallic alloy that is softer than the associated impact holder such that force from the associated impact cutter blade deforms the associated impact tab before the associated impact holder.

22. An impact cutter blade and holder system, comprising:
a cutter disk having a central axis about which the cutter disk is configured to rotate:

a plurality of impact holders, wherein each of the plurality of impact holders is secured to the cutter disk;

a plurality of impact cutter blades, wherein an associated impact cutter blade of the plurality of impact cutter blades is secured to an associated impact holder of the plurality of impact holders; and a plurality of wear slugs, wherein an associated wear slug of the plurality of wear slugs is secured to the associated impact holder of the plurality of impact holders, and wherein the associated wear slug is securely positioned to shield the associated impact holder of the plurality of impact holders from damage by comminution material, wherein the associated impact cutter blade of the plurality of impact cutter blades includes a ridge that runs along a length of the associated impact cutter blade and acts as a fulcrum when the associated impact cutter blade is secured in a blade mounting slot of the associated impact holder.

23. The impact cutter blade and holder system of claim 22, wherein the blade bolt is tightened against the stepped nut, which generates leverage against the fulcrum that forces a leading edge of the associated impact cutter blade against a forward opposite side of the blade mounting slot in the associated impact holder.

24. The impact cutter blade and holder system of claim 23, wherein the leverage provides tension that keeps the blade bolt from coming loose.

25. An impact cutter blade and holder system, comprising:

a cutter disk having a central axis about which the cutter disk is configured to rotate:

a plurality of impact holders, wherein each of the plurality of impact holders is secured to the cutter disk;

a plurality of impact cutter blades, wherein an associated impact cutter blade of the plurality of impact cutter blades is secured to an associated impact holder of the plurality of impact holders; and a disk wear cover plate secured to the cutter disk, wherein the disk wear cover plate is shaped and sized to shield the cutter disk and the secured plurality of impact holders from damage by comminution material;

wherein the associated impact cutter blade of the plurality of impact cutter blades contains a blade bolt hole for securing the associated impact cutter blade to the associated impact holder using the blade bolt hole, wherein a blade bolt is positioned through the blade bolt hole;

wherein the associated impact cutter blade of the plurality of impact cutter blades is secured through the blade bolt hole of the associated impact cutter blade to the associated impact holder using the blade bolt and a stepped nut, wherein the stepped nut has a lower portion and a stepped portion that is raised higher than the lower portion of the stepped nut, and wherein the stepped portion of the stepped nut contacts the associated impact cutter blade on a trailing edge of the blade bolt hole;

wherein the associated impact cutter blade of the plurality of impact cutter blades includes a ridge that runs along a length of the associated impact cutter blade and acts as a fulcrum when the associated impact cutter blade is secured in a blade mounting slot of the associated impact holder.

26. The impact cutter blade and holder system of claim 25, wherein the blade bolt is tightened against the stepped nut, which generates leverage against the fulcrum that forces a leading edge of the associated impact cutter blade against a forward opposite side of the blade mounting slot in the associated impact holder.

27. The impact cutter blade and holder system of claim 26, wherein the leverage provides tension that keeps the blade bolt from coming loose.

* * * * *

UNITED STATES PATENT AND TRADEMARK OFFICE
CERTIFICATE OF CORRECTION

PATENT NO. : 11,084,043 B2
APPLICATION NO. : 16/508966
DATED : August 10, 2021
INVENTOR(S) : John H. Hughes Page 1 of 1

It is certified that error appears in the above-identified patent and that said Letters Patent is hereby corrected as shown below:

On the Title Page

Page 2, Column 1, Item (56) References Cited/U.S. Patent Documents:
"4,033,515 A 7/1977 Bartell et al." should read: -- 4,033,515 A 7/1977 Barcell et al. --.

Page 2, Column 1, Item (56) References Cited/U.S. Patent Documents:
"4,120,460 A 10/1978 Bucher" should read: -- 4,120,460 A 10/1978 Bacher --.

In the Claims

Column 20, Claim 22, Line 67:
"disk is configured to rotate:" should read: -- disk is configured to rotate; --.

Column 21, Claim 25, Line 30:
"disk is configured to rotate:" should read: -- disk is configured to rotate; --.

Signed and Sealed this
First Day of November, 2022

Katherine Kelly Vidal
*Director of the United States Patent and Trademark Office*